March 28, 1961 L. D. COBB 2,977,161
ANTIFRICTION BEARING AND METHOD OF OPERATION
Filed Nov. 23, 1954 2 Sheets-Sheet 2
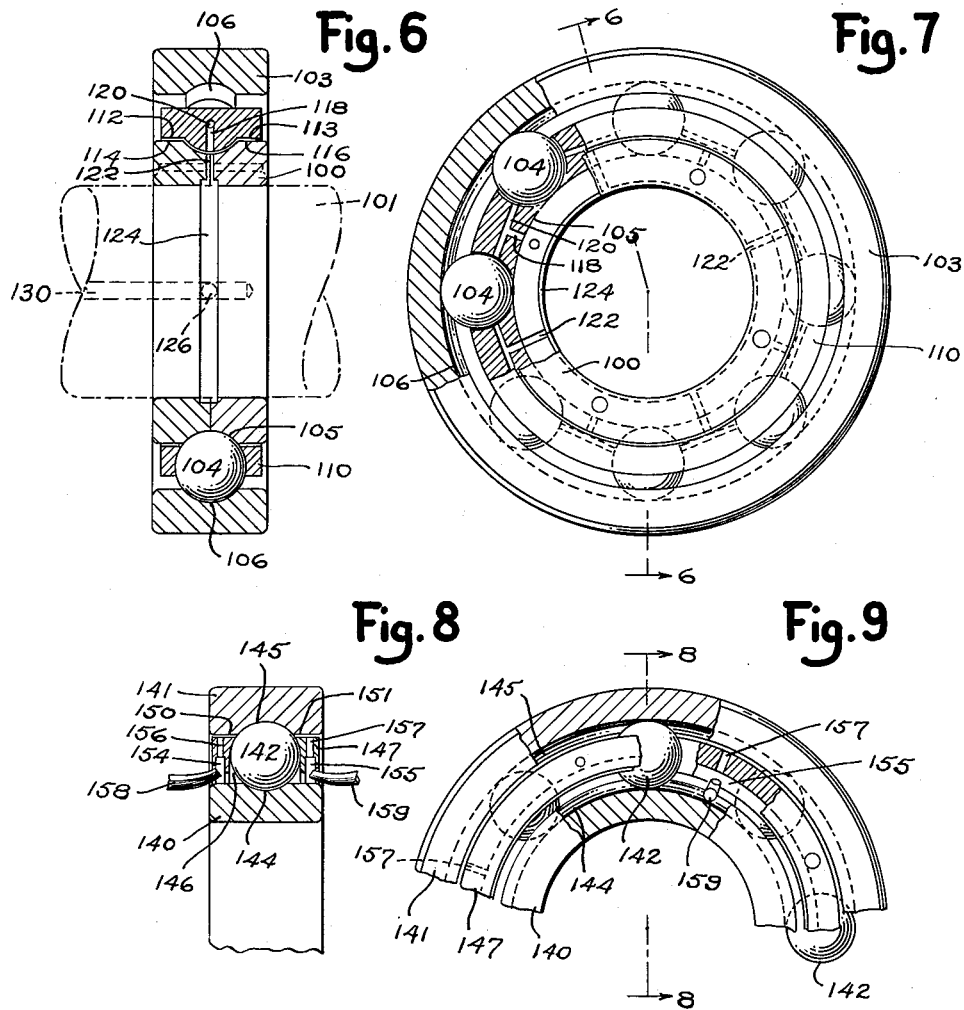
INVENTOR:
LELAND D. COBB
BY Edward H. Goodrich,
HIS ATTORNEY.

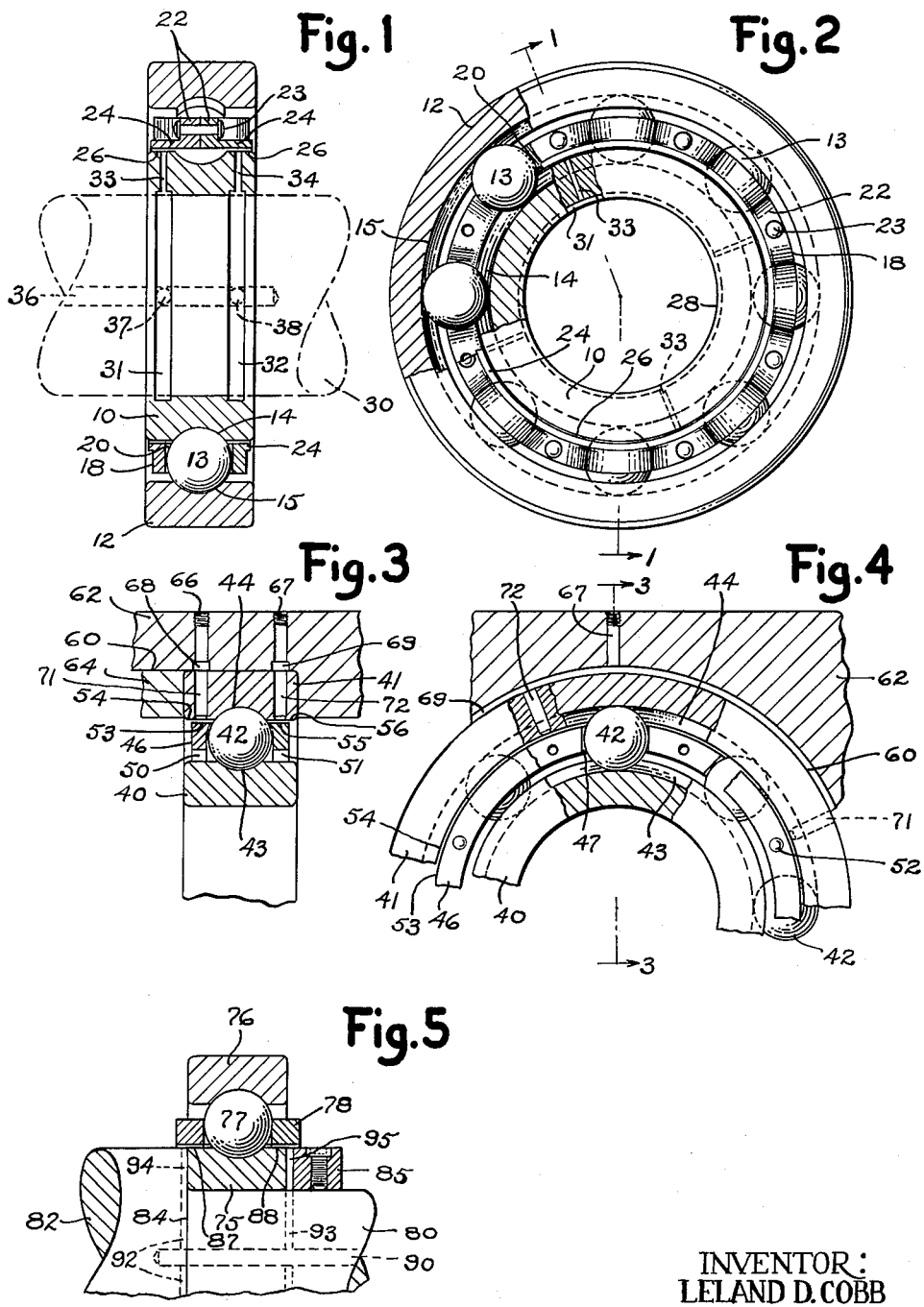

United States Patent Office 2,977,161
Patented Mar. 28, 1961

2,977,161

ANTIFRICTION BEARING AND METHOD OF OPERATION

Leland D. Cobb, Forestville, Conn., assignor to General Motors Corporation, Detroit, Mich., a corporation of Delaware Filed Nov. 23, 1954, Ser. No. 470,684

11 Claims. (Cl. 308—187)

This invention relates to antifriction bearings and particularly to an improved antifriction construction and method of operation wherein the friction between relatively movable bearing parts is greatly reduced.

It has been common practice in antifriction bearings such as in ball bearings that operate at high speeds to space the balls or rolling elements from each other to prevent these fast moving rolling elements from striking each other and from rubbing against each other while rolling within the raceways of the relatively rotatable bearing race rings. The repeated impacts of these rolling elements against each other as well as their rubbing contacts is injurious to the bearing and results in shortened bearing life as well as objectionable bearing noise. Uniform spacing of the rolling elements in these bearings may be accomplished by providing between the bearing race rings an annular separator or cage slidably journalled on one of the race rings and having circumferentially spaced pockets in which the rolling elements are loosely received. Even though there is sufficient lubricant present in such a bearing, there is detrimental friction between the separator and the members which it engages during bearing operation. Under conditions of high speed bearing operation, this objectionable friction may cause sufficient heating of the bearing to result in lubricant failure and in rapid wear of the bearing parts with a much shortened bearing life.

It is, therefore, an object of this invention to provide an improved separator and an improved method of operation for an antifriction bearing wherein the friction of bearing parts is greatly reduced and wherein the separator is at least partially supported by a gaseous medium during bearing operation.

Another object resides in an improved construction and method of operation for an antifriction bearing wherein the separator for the rolling elements has its friction substantially eliminated by using a gaseous meduim to support the separator and to position the rolling elements during bearing operation.

A further object is to substantially eliminate separator friction in a high speed antifriction bearing through the introduction of an atomized antifriction medium in a gaseous vehicle fed between the closely moving parts during bearing operation.

To these ends and also to improve generally upon devices and methods of this character, this invention consists in the various matters hereinafter described and claimed. In its broader aspects, the invention is not necessarily limited to the specific arrangements selected for illustration purposes in the accompanying drawings wherein Figure 1 is a cross section taken along the line 1—1 of Figure 2 and showing one form of my improved bearing.

Figure 2 is a side elevation of the embodiment of Figure 1.

Figure 3 is a fragmentary cross section of a modified form of my invention and taken along the line 3—3 of Figure 4.

Figure 4 is a broken away side elevation of the structure of Figure 3.

Figure 5 is a fragementary cross section through another embodiment of my invention.

Figure 6 is a cross sectional view taken along the line 6—6 of Figure 7 and showing another modification of this invention.

Figure 7 is a broken away side elevation of the structure of Figure 6.

Figure 8 is a fragmentary cross section taken along the line 8—8 of Figure 9 and illustrating a further modification.

Figure 9 is a fragmentary side elevation of the arrangement of Figure 8.

In Figures 1 and 2 a pair of inner and outer race rings 10 and 12 are antifrictionally supported for relative coaxial rotation through intervening rolling elements, here-in shown as balls 13 that are free to roll in annular raceways 14 and 15 in these race rings. The balls 13 are looosely guided in spaced relation by an annular separator or cage 18 preferably formed from a suitable light weight wear resistant material that has a low coefficient of friction in the presence of lubricant. In this illustrated embodiment, the separator has two corresponding annular sections cooperatively providing circumferentially spaced radially disposed ball-receiving pockets 20 spaced from each other by generally flat intermediate portions 22 secured together as by rivets 23. Each separator section has an annular skirt 24 closely surrounding a cylindrical land 26 at one side of the raceway 14, the diameter of the inner cylindrical face of each skirt preferably being slightly greater than the diameter which would normally be required for a running fit of the skirt on the cylindrical land 26 which it surrounds. The cylindrical inner bore 28 of the race ring 10 is arranged to tightly receive a shaft 30 and this race ring is annularly grooved at 31 and 32 and corresponding pairs of circumferentially spaced passages 33 and 34 in this race ring 10 extend from these grooves and open at their outer ends through the cylindrical lands 26 beneath the skirts 24. I preferably provide several pairs of these passages 33 and 34 in uniformly spaced relation.

During operation of this bearing, a yieldable fluid medium such as gas or air under pressure is fed through a bore 36 in the shaft 30 and through communicating generally radially disposed shaft passages 37 and 38 respectively into the grooves 31 and 32 from which the gas under pressure will flow out through all of the passages 33 and 34 into the annular space between the lands 26 and the surrounding skirts 24 to antifrictionally support the separator 18 upon an annular cushioning pocket of gas and out of frictional engagement with the inner race ring 10. The outer diameter of the separator is less than that of the bore through the outer race ring 12 so that there is no frictional engagement of the separator with the outer race ring. The fluid medium of suitable gas under pressure will escape from between the skirts 24 and the inner race ring 10 and will also diffuse throughout the bearing and around the rolling elements thus aiding in cooling of the bearing. I have found that when there is insufficient protection in the form of a suitable antifriction means between two clean metal bearing surfaces in moving contact with each other, the abrading interengagement of the asperities in these opposed surfaces produces rapid wear and further roughness and even welding together of these engaging parts all of which soon results in bearing failure. If desired, an antifriction material, such as various sulphides or other suitable lubricants, may be atomized with the gaseous medium to further aid lubrication and cooling of the antifriction bearing particularly if adjacent bearing parts tend to engage each other. These atomized media form and maintain a coating on all adjacent bearing parts to protect these parts against corrosion, oxidation, and erosion, and avoid the dangers of welding together of the asperities on relatively movable adjacent parts. This arrangement makes very high speed operation of antifriction bearings practicable since the friction between the separator and the race rings is eliminated and power losses and wear of bearing parts which heretofore have been a seriously detrimental factor in high speed bearing operation, are greatly reduced. Furthermore, the leakage of the gaseous medium from the bearing effectively prevents the entrance of dirt and other deleterious matter into the bearing.

In the embodiment of Figures 3 and 4, a pair of coaxial inner and outer race rings 40 and 41 are radially spaced apart for relative rotation through an intervening series of spaced rolling elements, as balls 42, that roll in raceways 43 and 44 formed in these race rings. The balls 42 are loosely guided in uniformly spaced relation by an annular separator 46 having a series of circumferentially spaced pockets 47 each of which receives and loosely guides a ball in engagement with the raceways. This separator is preferably made in two similar ring portions 50 and 51 suitably held together as by rivets 52. The ring portion 50 has a cylindrical peripheral face 53 loosely received within a cylindrical land 54 at one side of the outer raceway 44 and the other ring portion 51 has a similar cylindrical periphery 55 loosely received within a corresponding cylindrical land 56 at the other side of the raceway 44. The diameters of the peripheral faces 53 and 55 are preferably slightly less than that normally required for a freely running fit of the separator 46 within the outer race ring in the presence of suitable lubricant. If desired, each ball pocket 47 may partially conform to the curvature of the ball loosely received therein so that the separator will be at least partially supported by one or more balls at the start of bearing rotation. The inner diameter of the separator exceeds the outer diameter of the inner race ring so that the separator will remain out of engagement with the inner race ring.

The bearing of Figures 3 and 4 may be suitably mounted in operative position as by seating the cylindrical periphery of the outer race ring 41 in a bore 60 in a housing 62. If desired, the outer race ring 41 may engage a housing shoulder and may be held in position by a collar 64 pressed into the bore 60 and against this race ring. A gaseous medium from a suitable source is fed through housing passages 66, 67 into grooves 68, 69 formed in the housing 62 and radially opening onto the outer race ring periphery. Circumferentially spaced passages 71 and 72 extend generally radially through the outer race ring 41 and direct the gaseous medium from the grooves 68 and 69 into the annular spaces between the separator and the cylindrical lands 54 and 56 at each side of the raceway 44 to antifrictionally support the separator on an annular cushion of the gaseous medium in generally the same manner as explained with reference to Figures 1 and 2. If desired, suitable antifriction means may be atomized with the gaseous medium to further protect the closely adjacent bearing surfaces against corrosion, oxidation, erosion and from welding together of asperities on adjacent surfaces. The leakage and diffusion of the gaseous medium through and out of the bearing will not only aid in cooling and lubricating the bearing but will also keep dirt and dust from entering the bearing.

In the embodiment of Figure 5, a pair of relatively rotatable inner and outer race rings 75, 76 are radially spaced by balls 77 loosely positioned in circumferentially spaced relation by an annular separator 78. The inner race ring 75 is mounted on the reduced portion 80 of a shaft 82 and abuts a shaft shoulder 84. A collar 85 mounted on the shaft reduction abuts the outer end of the inner race ring. The shaft portion abutting the inner race ring 75 and the collar have external diameters substantially the same as that of adjacent cylindrical lands 87 and 88 at each side of the raceway in the inner race ring. The annular separator 78 extends beyond the ends of the race rings and overlies part of the shaft and the collar 85 in closely spaced relation. A gaseous medium under pressure is directed into a shaft bore 90 and thence through generally radially extending shaft bores 92 and 93 which respectively communicate with grooves 94 and 95 in the shaft shoulder 84 and in the end of the collar 85 adjacent to the inner race ring 75. These grooves direct the gaseous medium into the annular pockets between the lands 87 and 88 and the separator 78 to support the separator on an annular gas cushion in general accord with the gaseous support of the separator of Figures 1 and 2.

In the embodiment shown in Figures 6 and 7, an inner race ring 100 mounted on a suitable shaft 101 is relatively rotatable in coaxial relation to an outer race ring 103 through a series of intervening balls 104 arranged to roll in inner and outer raceways 105 and 106. These balls are circumferentially spaced by an annular separator 110 having a pair of annular skirts 112 and 113 in closely spaced surrounding relation to a pair of cylindrical annular lands 114 and 116 respectively located at opposite sides of the inner raceway 105. Each of these skirts is preferably slightly frusto-conical with its outer edge closer than its inner edge to the adjacent land which it surrounds. The separator pockets which receive the balls 104 are preferably in closely spaced generally conforming relation thereto but loosely receive the balls therein to permit free rotation of the balls during bearing operation.

The separator portion between the balls is preferably slightly arcuate transversely of the race rings and in closer spaced relation to the inner raceway 105 than the spacing between the skirts and the lands which they respectively surround. As illustrated in Figures 6 and 7, the separator portions between adjacent balls 104 closely conform longitudinally and transversely to the adjacent raceway curvature to provide a loose interfitting relation of the separator with the raceway 105. For convenience of assembly, the inner race ring may be made in two parts as shown and secured together by rivets. The separator portions between the balls are each provided with a generally radial passage 118, each of which opens at its outer end into an intermediate portion of a passage 120 extending between adjacent ball pockets. The inner race ring 100 is provided with a plurality of circumferentially spaced radial passages 122 opening at their outer ends into the inner raceway 105 and opening at their inner ends into an annular groove 124 that is formed in the inner race ring in surrounding relation to the shaft 101. Spaced radial extending passages, one of which is shown at 126 are formed in the shaft 101 and extend between the groove 124 and a central shaft bore 130.

In operation of the embodiment of Figures 6 and 7, a gaseous medium which may contain a suitable antifriction means atomized therewith if desired, is fed under suitable pressure into the passage 130 and directed through the passages 126 into the groove 124 from whence it is delivered by the inner race ring passages 122 into the raceway 105. This gas then flows under pressure between the separator and the inner race ring to support the separator on an annular gaseous cushion. In view of the slightly frusto conical contours of the skirts 112 and 113, the gas will pocket under pressure between the skirts and the adjacent race ring lands. Also, this gas under pressure will flow through the passages 118 and 120 into the ball pockets to form a gaseous cushion between the balls and the separator thereby very greatly reducing friction of the balls against the separator. In view of the fact that the radial space between the separator and the inner raceway 105 is less than the space between the separator skirt corners and the lands 114 and 116 which these skirts surround, the outer edges of these skirts will always be prevented from rubbing contact with consequent wear against the adjacent lands. The flow of gaseous medium as it diffuses through the bearing will not only greatly reduce the friction of the various closely associated bearing parts, but will also maintain the bearing in a desirable cool running condition as well as prevent the ingress of dirt, dust and other deleterious matter into the bearing.

In the embodiment of Figures 8 and 9, a pair of relatively rotatable inner and outer race rings 140 and 141 are arranged for coaxial antifrictional rotation by a series of intervening balls 142 arranged to roll in bearing raceways 144 and 145. These balls are circumferentially spaced by being loosely received in generally radially extending ball pockets 146 in an annular separator 147. Cylindrical peripheral separator portions or walls at each side of the ball pockets are loosely received within correspondingly located cylindrical lands 150 and 151 in the outer race ring at each side of its raceway 145. The inner diameter of the separator 147 appreciably exceeds the outer diameter of the inner race ring to maintain the separator out of inner race ring contact. If desired, the outer end of the ball pockets 146 may conform somewhat to the contours of the balls which they receive so that the separator will be partially supported by the balls at start of bearing operation.

The outer ends of the separator are respectively provided with annular grooves 154 and 155 opening radially inwardly, and separator passages 156 and 157 extending from these grooves open onto the separator periphery adjacent to the lands 150 and 151. A plurality of circumferentially spaced pipes 158 and 159 receive a gaseous medium and direct it through nozzle portions at the ends of these pipes into the annularly extending grooves 154 and 155 from whence the gaseous medium flows through the passages 156 and 157 into the annular pocket between the separator periphery and the lands 150 and 151. With this arrangement, a condition of gaseous equilibrium under pressure is produced in the grooves 154 and 155 and in the annular space between the separator and the outer race ring thereby supporting the separator 147 so that it may freely rotate without appreciable friction on a gaseous pocket and out of contact with both race rings. Also, gas under pressure from the nozzles will divert from the nozzles and the pockets 154 and 155 into the ball receiving pockets of the separator to provide an antifriction gaseous medium between the balls and the separator thereby greatly reducing the friction of the separator during operation. It will be appreciated, of course, that like my other embodiments, if desired, a suitable antifriction means may be atomized with the gaseous medium to further aid lubrication.

I claim:

1. An antifriction bearing comprising a pair of relatively rotatable race rings having raceways therein, rolling elements in the raceways, a separator circumferentially spacing the rolling elements, a pair of cylindrical lands on one of the race rings respectively located at opposite sides of the raceway therein, a pair of laterally projecting cylindrical skirts on the separator each of which is in loosely surrounding relation and engageable with one of said lands, and means providing a plurality of spaced passages through said one race ring and opening through said lands for directing gas under pressure between the lands and the adjacent skirts to antifrictionally support the separator on an annular pocket of gas and out of race ring engagement during bearing operation.

2. An antifriction bearing comprising a pair of relatively rotatable race rings having raceways therein, rolling elements in the raceways, an annular separator between the race rings and having rolling element receiving pockets for circumferentially spacing the rolling elements, a pair of cylindrical lands on one of the race rings respectively located at opposite sides of a raceway, a pair of frusto conical separator portions respectively and loosely surrounding said lands, and means providing passages in said one race ring for delivering gas under pressure between the lands and the frusto-conical separator portions to antifrictionally support the separator on a pocket of gas.

3. An antifriction bearing comprising a pair of relatively rotatable race rings having raceways therein, rolling elements in the raceways, an annular separator circumferentially spacing the rolling elements and extending axially beyond both of the race rings, a pair of cylindrical lands on one of the race rings and respectively located at each side of one of the raceways, internal cylindrical portions on each end of the separator in closely overlying relation to said lands, and means to deliver a gaseous medium under pressure through said one race ring and between said cylindrical portions and said lands to support the separator on a pocket of gas coaxially of the race rings and out of contact therewith during bearing operation.

4. An antifriction bearing comprising a pair of relatively rotatable race rings having radially opposed raceways therein, rolling elements in the raceways, a separator circumferentially spacing the rolling elements, spaced arcuate portions on said separator and between the rolling elements and loosely interfitting within one of the raceways, and one of said race rings having a plurality of passages therethrough and opening onto the said one raceway in opposed relation to said arcuate separator portions for directing a gaseous medium under pressure against said arcuate portions to support the separator on a pocket of gas during bearing operation.

5. An antifriction bearing comprising a pair of relatively rotatable race rings having raceways, rolling elements in the raceways, a separator circumferentially spacing the rolling elements, a pair of annular lands on one of the race rings and respectively located at opposite sides of the raceway therein, an intermediate curved portion on the separator loosely interfitting with the raceway between said lands, a pair of annular portions on the separator and adjacent to said lands, and said one race ring having a plurality of passages for directing a gaseous medium into a raceway and out between the separator and said lands to antifrictionally support the separator out of race ring engagement.

6. An antifriction bearing comprising a pair of relatively rotatable race rings having raceways, rolling elements in the raceways, an annular separator between the race rings and circumferentially spacing the rolling elements, an intermediate arcuate portion on the separator in loosely slidable interfitting engagement with one of said raceways, cylindrical lands on one of the race rings at each side of the last mentioned raceway, frusto conical skirt portions on the separator in closely spaced relation to said lands, and said one race ring having passages opening into its raceway adjacent the arcuate separator portion for delivering a gaseous medium under pressure between the race ring and the frusto conical skirt portions to substantially support the separator on a pocket of gas during bearing operation.

7. An antifriction bearing comprising a pair of relatively rotatable race rings having raceways, balls in rotatable engagement with said raceways, an annular separator having a plurality of circumferentially spaced pockets receiving said balls, one of the race rings having a pair of cylindrical lands at opposite sides of its raceway, an arcuate separator portion slidably engageable with the raceway between said lands, frusto conical separator portions in closely spaced relation to said lands, the separator being provided with passages communicating with adjacent ball pockets and with the raceway between said lands, and said one race ring having a plurality of circumferentially spaced passages opening onto the raceway within which the separator loosely interfits, said passages being arranged to receive a gaseous medium under pressure which will be directed between the separator and the adjacent race ring to support the separator out of race ring contact and which gaseous medium will also be directed into the ball pockets to reduce the friction of the balls against the separator during bearing operation.

8. In an antifriction bearing having relatively rotatable race rings spaced apart by rolling elements that are guided by a separator loosely engaging one of the race rings, the method of reducing friction by introducing under pressure a gaseous medium between the separator and said one race ring to support the separator substantially out of contact with the race rings during bearing operation.

9. The method of reducing friction within antifriction bearings having relatively rotatable race rings and rolling elements therebetween and having a rolling element guiding separator loosely interfitting with one of the race rings which comprises continuously and forcibly directing a stream of gaseous medium between the relatively movable bearing parts to maintain these parts out of frictional engagement.

10. The method of reducing friction in an antifriction bearing having relatively rotatable race members and rolling elements guided by a separator comprising the steps of providing an atomized medium in a gase, delivering said gaseous suspension under pressure throughout the bearing and coating the adjacent bearing parts with the atomized medium to protect said parts from corrosion, oxidation, and erosion as well as to separate the adjacent bearing parts from engagement with each other.

11. The method of reducing friction in antifriction bearings having relatively rotatable race rings spaced by rolling elements that are guided by a separator loosely interfitting with one of the race rings which comprises continuously and forcibly directing a gaseous suspension of atomized antifriction medium between the working parts of the bearing to locate said bearing parts out of engagement with each other.

References Cited in the file of this patent

UNITED STATES PATENTS

| | | |
|---|---|---|
| 1,769,736 | Fieux | July 1, 1930 |
| 1,915,287 | Bott | June 27, 1933 |
| 2,160,418 | Horger | May 30, 1939 |
| 2,280,659 | Muller | Apr. 21, 1942 |
| 2,474,072 | Stoner | June 21, 1949 |
| 2,697,645 | Mitchell | Dec. 21, 1954 |

FOREIGN PATENTS

| | | |
|---|---|---|
| 635,757 | France | Mar. 24, 1928 |
| 592,947 | Great Britain | Oct. 3, 1947 |
| 66,206 | Holland | Aug. 15, 1950 |